(12) United States Patent
Park (10) Patent No.: US 7,600,702 B2
(45) Date of Patent: Oct. 13, 2009

(54) FUEL INJECTION SYSTEM

(75) Inventor: Guk Hyun Park, Youngnam Apt. 111-901, 1050-71, Bangchon-dong, Dong-gu, Daegu (KR)

(73) Assignees: Hyundai Motors Company, Seoul (KR); Guk Hyun Park, Daegu (KR); Motonic Corporation, Seoul (KR)

( * ) Notice: Subject to any disclaimer, the term of this patent is extended or adjusted under 35 U.S.C. 154(b) by 506 days.

(21) Appl. No.: 11/226,715

(22) Filed: Sep. 13, 2005

(65) Prior Publication Data

US 2006/0060681 A1 Mar. 23, 2006

(30) Foreign Application Priority Data

Sep. 13, 2004 (KR) .................. 10-2004-0072878

(51) Int. Cl.
*F02M 51/00* (2006.01)
(52) U.S. Cl. .............. 239/585.5; 239/585.1; 239/585.4; 239/590.3; 239/600
(58) Field of Classification Search ............ 239/533.12, 239/585.1, 585.3, 585.4, 585.5, 590, 590.3, 239/600, 104, 574; 123/294, 499, 525, 527
See application file for complete search history.

(56) References Cited

U.S. PATENT DOCUMENTS

| | | | | |
|---|---|---|---|---|
| 4,033,507 A | * | 7/1977 | Fromel et al. ............ | 239/585.1 |
| 4,982,901 A | * | 1/1991 | Holzgrefe ............... | 239/533.12 |
| 5,328,102 A | * | 7/1994 | Babitzka et al. .......... | 239/585.4 |
| 5,890,459 A | | 4/1999 | Hedrick et al. | |
| 6,796,543 B2 | * | 9/2004 | Haeberer et al. ......... | 239/585.3 |
| 6,877,678 B2 | * | 4/2005 | Xu et al. .................. | 239/585.1 |

FOREIGN PATENT DOCUMENTS

| | | |
|---|---|---|
| CN | 1461382 | 12/2003 |
| DE | 199 05 722 A1 | 8/1999 |
| DE | 103 04 143 A1 | 8/2004 |
| DE | 602 01 764 T2 | 12/2005 |
| EP | 1 336 747 A2 | 8/2003 |
| JP | 09-250421 | 9/1997 |
| JP | 2003113754 A | 4/2003 |
| KR | 10-1999-005112 | 1/1999 |
| KR | 1020020045118 A | 6/2002 |

\* cited by examiner

*Primary Examiner*—Steven J Ganey
(74) *Attorney, Agent, or Firm*—Morgan, Lewis & Bockius LLP (57) ABSTRACT

A fuel injection system for preventing fuel leakage to a combustion chamber when an engine is stopped includes an injector for injecting fuel, a case receiving the injector, a solenoid valve provided in a fuel passage connecting the injector and a nozzle pipe through a fuel supplying pipe, so as to supply and shut off fuel.

5 Claims, 6 Drawing Sheets

FUEL INJECTION SYSTEM

This application claims priority to and the benefit of Korean Patent Application No. 10-2004-0072878 filed in the Korean Intellectual Property Office on Sep. 13, 2004, the entire contents of which are incorporated Herein by reference.

BACKGROUND OF THE INVENTION (a) Field of the Invention

The present invention relates to a fuel injection system of a vehicle. More particularly, the present invention relates to a fuel injection system for preventing fuel leakage into the combustion chamber while an engine stops.

(b) Description of the Related Art

Typically, an engine of a vehicle operates by repeating processes of intake, compression, explosion, and exhaust, such that a reciprocal motion of a piston rotates a crankshaft. Such engines may be considered in different categories, for example, a gasoline engine, a diesel engine, etc., depending on a type of fuel.

A newer type of vehicle, an LPG engine vehicle, using liquefied petroleum gas as a fuel, is now being used. The LPG engine vehicle typically has a vaporizer vaporizing LPG compressed to 5 bar in the bombe (LPG tank), an apparatus for supplying LPG mixed with air in a mixer to a combustion chamber of an engine, an apparatus (LPI engine) for supplying LPG pressured under 15 bar (which is a combined pressure of an inside pressure of the bombe and a pressure made by a pump) through an injector to a combustion chamber. The injector used in an LPI engine is under pressure of 5~15 bar when the engine stops.

The injector is an apparatus for injecting fuel into an inside of an engine. The injector has a function of controlling an amount of liquid fuel according to an operation of an accelerator, and a function of shutting off fuel supply when an engine stops. However, as the injector is used, the shutting off function deteriorates since the injector is repeatedly used (to control the amount of fuel) under conditions of high temperature and heavy vibration. The shutoff components can be gradually worn away, In an LPG engine, since the fuel under predetermined pressure can leak out through the injector when an engine stops, a greater amount of fuel gas compared to air can be supplied to the combustion chamber. In such a case, the engine cannot be started, and if started, noxious gas is created and exhausted. In addition, since LPG is vaporized in the fuel injection system before being injected to the combustion chamber, a performance of the engine is deteriorated.

To resolve the above-mentioned problems, to prevent LPG leakage at the injector, and to prevent vaporization, many kinds of apparatuses and methods have been employed. However, previous attempts have not to date provided a basic solution.

The above mentioned problems can occur not only in an LPG engine but also in a gasoline vehicle, even though the viscosity and the evaporation point of LPG and gasoline are different from each other.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a fuel injection system having advantages in preventing fuel leakage to a combustion chamber by shutting off fuel from an injector to the combustion chamber while an engine stops. In addition, embodiments of the present invention provide a fuel injection system having advantages of improving startability of the vehicle and reducing noxious exhaust gas generated during an early stage of engine starting.

An exemplary fuel injection system according to an embodiment of the present invention includes a fuel injection system including an injector for injecting fuel, a case receiving the injector, and a solenoid valve provided in a fuel passage connecting the injector and a nozzle pipe through a fuel supplying pipe, so as to supply and shut off fuel.

A conical inlet part may be formed in the solenoid valve receiving part of the case connected to the fuel supplying pipe. The solenoid valve may include a core shaft disposed in a hollow portion of a core rolled with a coil, a plunger provided in a front portion of the core shaft and having a spring receiving groove formed at a rear portion thereof, a shutter provided in a front portion of the plunger and being made of elastic material, and a spring disposed in the spring receiving groove and elastically supporting the plunger with respect to the core shaft. The shutter of the solenoid valve may be disposed in the solenoid valve receiving part so as to open and shut off the fuel passage in the conical inlet part formed in the solenoid valve receiving part of the case.

An injector bracket may be provided in a lower part of the case, and the solenoid valve may be provided with a fuel injection guide pipe and coupled to the injector bracket such that the fuel injection guide pipe is disposed in the same direction as a fuel injection direction of the injector.

The injector, the solenoid valve, and the nozzle pipe may be combined to form different shapes, for example, a sideways "T" shape, a small "r" shape, a "Y" shape, or an "I" shape.

An injection pipe and a valve seat may be provided in the fuel injection guide pipe, and the injection pipe and the valve seat are fixed to the fuel injection guide pipe by a valve seat supporting pipe.

The plunger may define an inner passageway through which fuel injection by the injector passes and an end plate may be provided at a lower end of the plunger, a closing projection being formed on the end plate and a plurality of penetration holes being formed on the periphery of the closing projection.

A screw thread for coupling with the case may be formed in an upper part of the injector bracket, and a core coupling part for coupling with a core of the solenoid valve is formed on a lower exterior surface of the injector bracket.

Another exemplary fuel injection system according to an embodiment of the present invention includes an injector for injecting fuel, a case defining an injector receiving part for receiving the injector and a fuel passage communicating with the injector receiving part, and a solenoid valve having a plunger, wherein the plunger is movable depending on an operation of the solenoid valve, so as to selectively open and close the fuel passage.

A solenoid valve receiving part communicating with the fuel passage may be formed in the case, and the plunger may be disposed in the solenoid valve receiving part.

A shutter made of elastic material may be provided at an end of the plunger, and wherein the shutter is contactable to a portion of the fuel passage exposed to the solenoid valve receiving part.

The fuel passage may be formed in a straight line, and the plunger may be disposed to be movable along a longitudinal direction of the fuel passage.

The solenoid valve may operate such that the plunger shuts off the fuel passage while an engine stops, and the solenoid valve may operate such that the plunger opens the fuel passage while the engine operates.

A further exemplary fuel injection system according to an embodiment of the present invention includes a case having an injector receiving part formed therein, an injector being received in the injector receiving part, and a solenoid valve disposed at an outlet of the injector receiving part, wherein the solenoid valve comprises a coil, a hollow plunger having a fuel passage formed therein and communicating with the solenoid valve receiving part, a closing projection formed downward in a lower surface of the plunger, and a through hole formed in the periphery of the closing projection, a fuel injection guide pipe disposed outside the plunger and having an injection hole formed at the position corresponding to the closing projection, and wherein the injection hole of the fuel injection guide pipe is selectively opened and closed by the plunger.

A valve seat is disposed between the lower surface of the plunger and the fuel injection guide pipe, the injection pipe communicating with the injection hole is combined to the valve seat, and the closing projection opens and closes the inlet of the injection pipe.

An upper surface of the valve seat facing a lower surface of the plunger may be formed in a tapered shape as a diameter of the upper surface of the valve seat becomes narrow toward a lower end thereof.

DETAILED DESCRIPTION OF THE EMBODIMENTS

Embodiments of the present invention will hereinafter be described in detail with reference to the accompanying drawings.

According to exemplary embodiments of the present invention, a solenoid valve is provided at a certain position in the fuel passage from an injector to a nozzle, so as to shut off a fuel supply into a fuel supplying pipe. Hereinafter, referring to FIG. 1 to FIG. 4, exemplary embodiments of the present invention will be described in detail.

Figure 1:
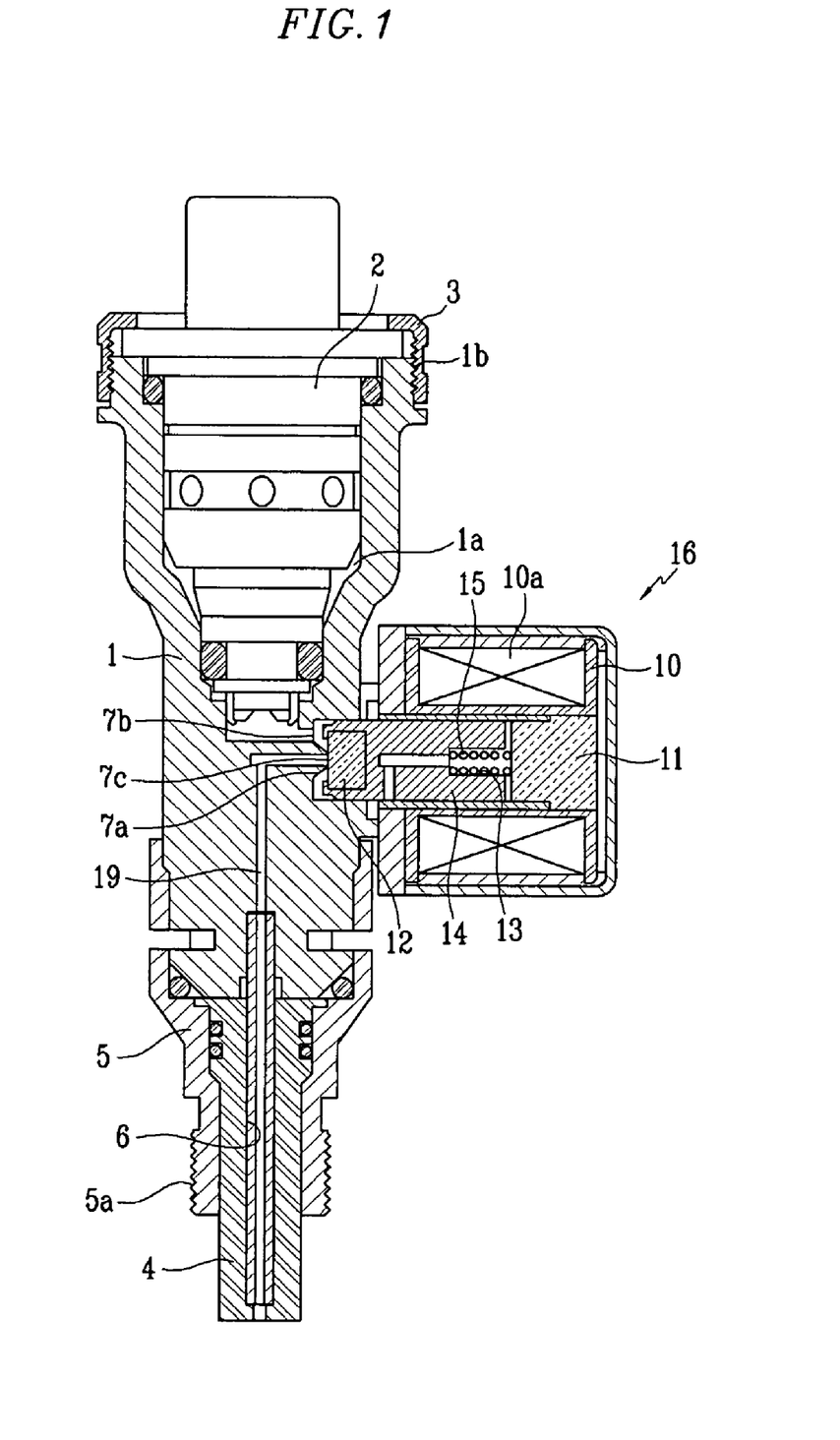
FIG. 1 is a cross-sectional view of a fuel injection system according to an exemplary embodiment of the present invention.

In the upper part of a case 1, an injector receiving part 1a is formed to receive an injector 2. On the outer surface of the case, a screw thread 1b is formed. The injector 2 is disposed in the injector receiving part 1a, and then, is fixed with a nut 3 having a screw thread formed at an interior surface thereof corresponding to the screw thread 1b.

A nozzle pipe 4 is combined to a lower part of the case 1 with a combining means 5 having a screw thread 5a formed thereon. For example, the case 1 can be combined to an engine (not shown), more particularly, to a cylinder block defining a combustion chamber, by the screw thread 5a of the combining means 5.

The case 1 has a fuel passage formed therein. The fuel passage generally refers to the entire path where fuel passes through. The fuel passage includes an inner path 19 connecting a solenoid valve receiving part 7 and a fuel supplying pipe 6, and an inner passageway formed inside of the fuel supplying pipe 6.

The solenoid valve receiving part 7 is formed at the position where an outlet of the injector and the inner path 19 is connected, in the case 1. In the solenoid valve receiving part 7, at least a portion of a solenoid valve 16 is disposed. The solenoid valve 16 includes a core 10 rolled with a coil 10a, a core shaft 11 provided in the hollow portion of the core 10, and a plunger 14 provided in a front portion of the core shaft 11.

A shutter 12 is provided at a front of the plunger 14, and a spring receiving groove 13 is formed at a rear portion of the plunger 14. In the spring receiving groove 13, a spring is disposed. The plunger is disposed in the hollow portion of the core 10.

In the solenoid valve receiving part 7 formed in the case 1, an inlet passage 7b communicating with the receiving part 7, and an outlet passage 7c communicating with the inner path 19, are formed. At a periphery of the outlet passage 7c, the case 1 is projected toward the solenoid valve receiving part 7 as a conical shape, and the projected part forms a conical inlet part 7a. The solenoid valve 16 is disposed in the solenoid valve receiving part 7 such that the shutter 12 is contactable to the conical inlet part 7a.

As shown in FIG. 1, if the inlet passage 7b and the outlet passage 7c are formed in the same side wall of the solenoid valve receiving part 7, and the shutter 12 is formed to simultaneously cover the inlet passage 7b and the outlet passage 7c, fuel leakage can be prevented more efficiently.

As shown in FIG. 1 to FIG. 4, when an ignition key of a vehicle, having a fuel injection system including a solenoid valve for preventing fuel leakage, is turned on, so as to operate an engine, the fuel (for example, LPG, gasoline, etc.) is supplied to the injector 2. Then, the injector 2 injects a fuel, and the fuel goes to the solenoid valve receiving part 7. At this time, the solenoid valve 16 is also operated. Magnetic force of the core 10 and core shaft 11 pull the plunger 14, and the spring 15 is compressed by the movement of the plunger 14 to the core shaft 11. The shutter 12 is then detached from the conical inlet part 7a connecting the inner path 19 and the fuel supplying pipe 6, and the outlet passage is opened.

When the outlet passage 7c is opened, the fuel injected from the injector 2 is applied to the combustion chamber through the nozzle pipe 4, and then, the engine operation is started. The amount of fuel is controlled by the operation of an accelerator.

On the other hand, when the ignition key is turned off, the injector 2 and the solenoid valve stop. At this time, fuel between the injector and a fuel tank (bombe) is under high pressure (if a by-pass line is provided the pressure lowers to the pressure of the fuel tank). However, since the solenoid valve closes the outlet passage 7c, fuel leakage is prevented.

Hereinafter, the above-described open and close processes of the outlet passage 7c will be described in more detail. Firstly, when the ignition key is turned off and the magnetic force disappears, the plunger 14 is moved backward due to the magnetic force of the core 10 and the core shaft 11 moves forward due to an elastic force of the spring 15.

When the plunger 14 moves forward, the shutter 12, combined at the front portion of the plunger 14, contacts with a conical inlet part 7a. Therefore, the outlet passage 7c communicating with the fuel supplying pipe 6 is closed, and fuel leakage to the combustion chamber is prevented.

It is preferable that the shutter 12 is made of an elastic material, such that the shutter 12 closes the outlet passage 7c formed at the conical inlet part 7a. If the shutter is made of an elastic material, the outlet passage 7c can be closed more efficiently.

When the ignition key is turned on again, the fuel in the fuel tank is injected to the combustion chamber through the injector 2, the solenoid valve receiving part 7, fuel supplying pipe 6, and nozzle pipe 4. In this case, before the injection, leaked fuel is not present in the combustion chamber. Therefore, since over supply of the fuel (when the engine is started to be operated) can be prevented, the engine may easily be started, and noxious exhaust gas may be reduced.

Figure 2:
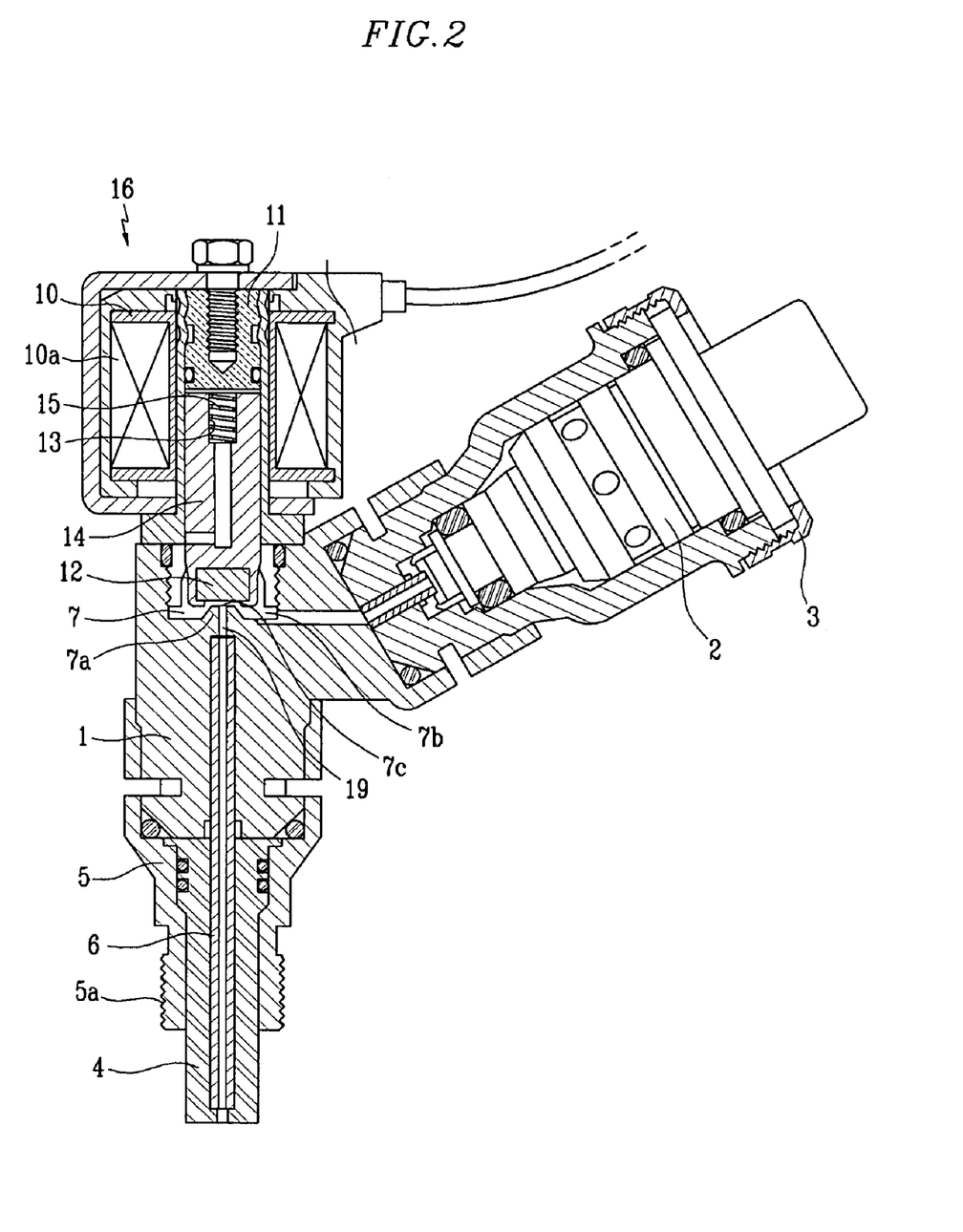
FIG. 2 is a cross-sectional view of a fuel injection system according to another exemplary embodiment of the present invention.
Figure 3:
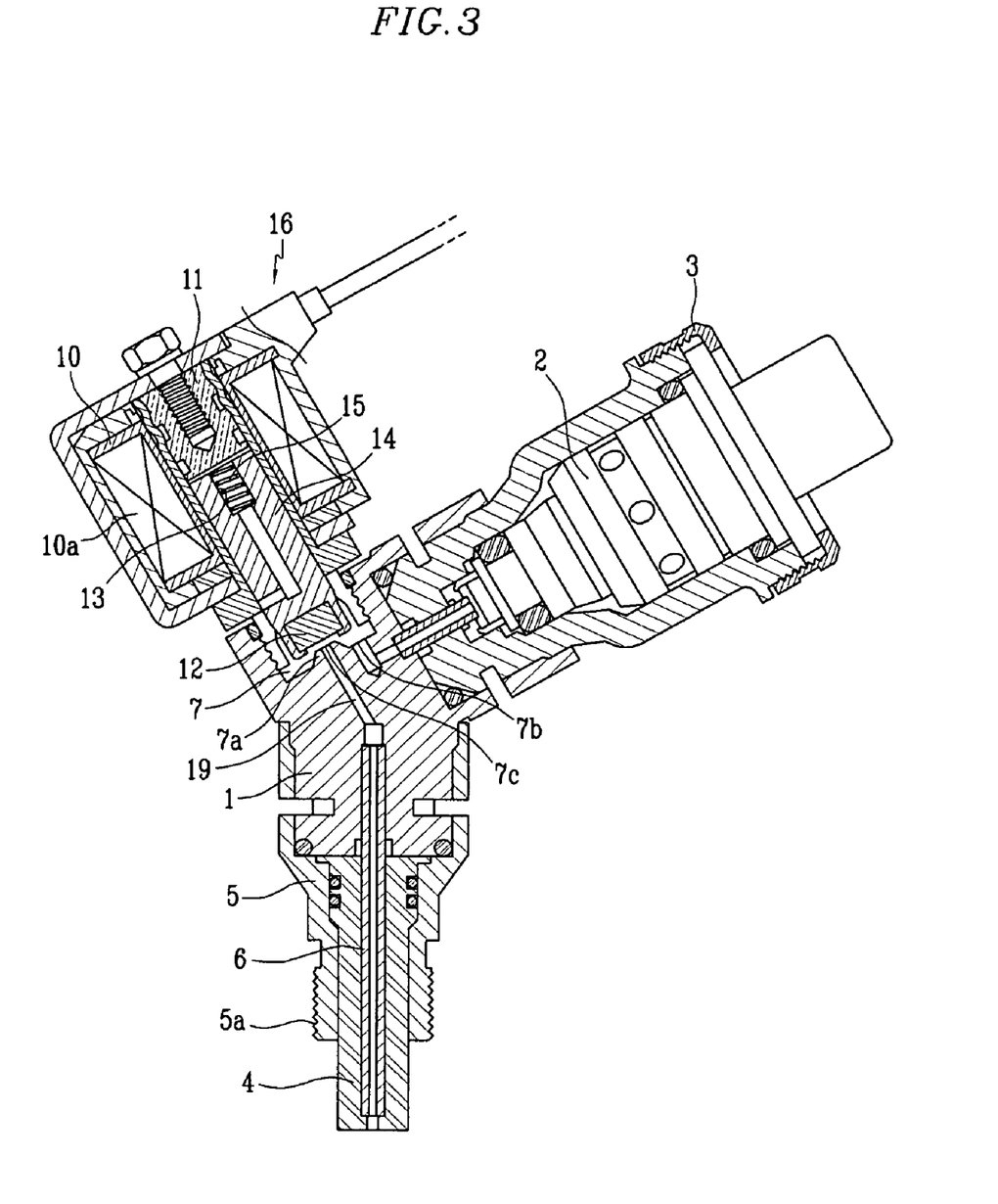
FIG. 3 is a cross-sectional view of a fuel injection system according to a further exemplary embodiment of the present invention.
Figure 4:
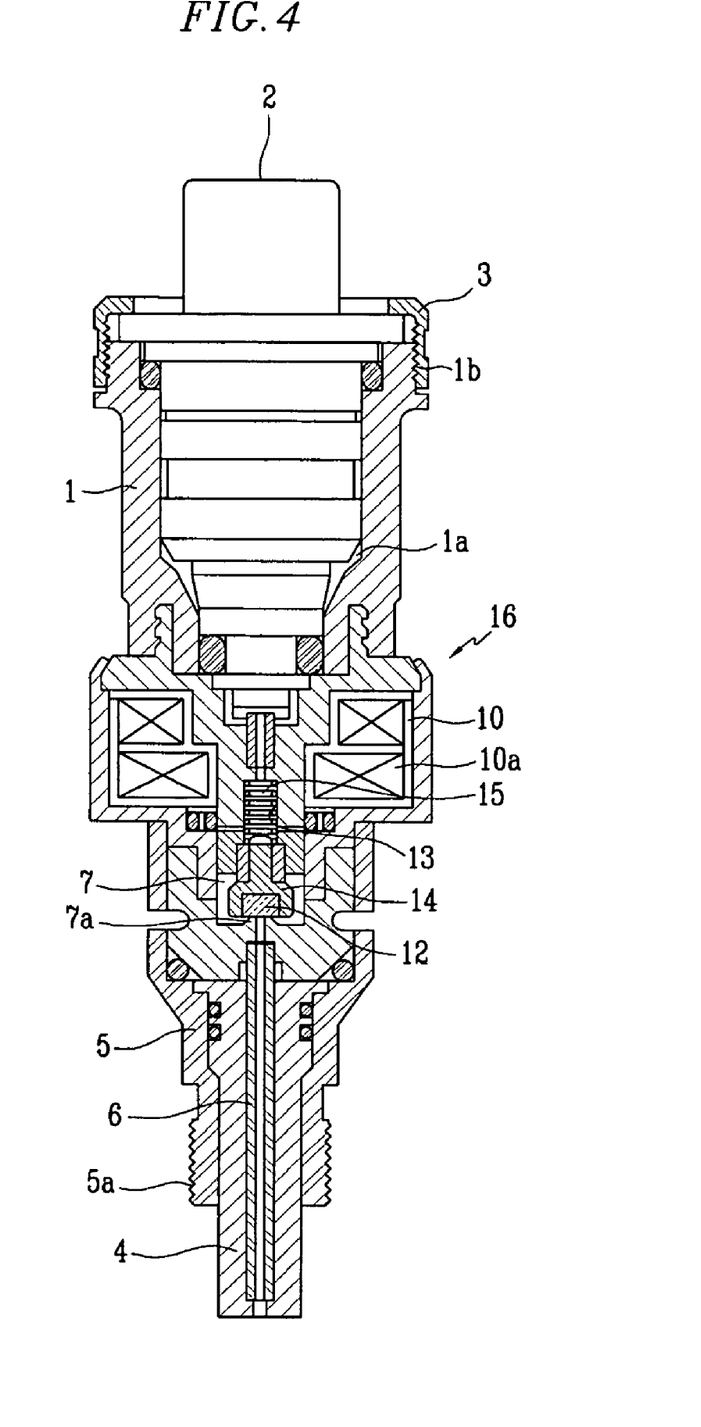
FIG. 4 is a cross-sectional view of a fuel injection system according to another exemplary embodiment of the present invention.

The fuel injection system of the present invention can be structured as a variable form, as shown in FIG. 1 to FIG. 4. FIG. 1 shows that the injector, the solenoid valve, and the nozzle pipe are combined to form the shape of approximately a sideways "T". FIG. 2 shows that the injector, the solenoid valve, and the nozzle pipe are combined to form the shape of a small letter "r." FIG. 3 shows that the injector, the solenoid valve, and the nozzle pipe are combined to form a shape of a "Y" and FIG. 4 shows that the injector, the solenoid valve, and the nozzle pipe are combined to form a shape of an "I."

Figure 5:
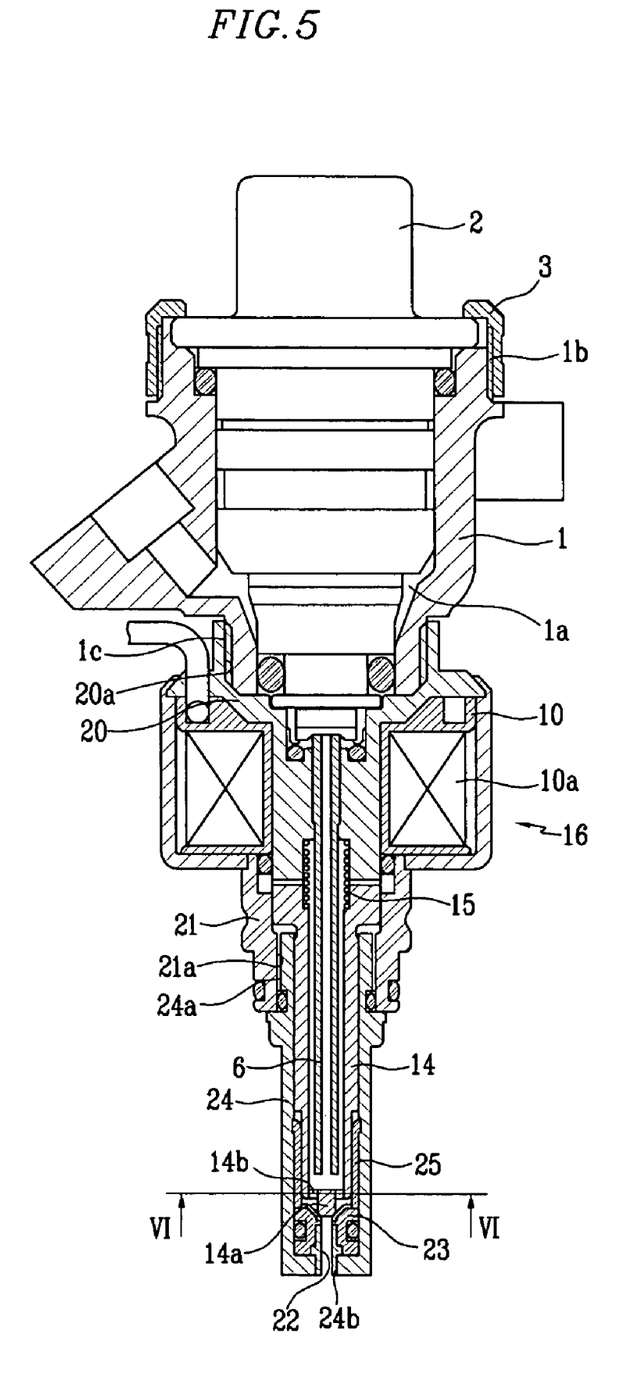
FIG. 5 is a cross-sectional view of a fuel injection system according to another exemplary embodiment of the present invention.

According to another exemplary embodiment of the present invention, as shown in FIG. 5, a case 1 has an injector receiving part 1a and a screw thread 1b, formed in the upper part thereof. The injector 2 is received in the injector receiving part 1a, and then is fixed with a nut 3.

At a screw thread 1c formed on the lower part of the case 1, an injector bracket 20 having a screw thread 20a formed in the upper part thereof is combined. The injector bracket 20 is inserted into the core 10 rolled with a coil 10a.

At the lower part of the injector bracket 20, a hollow plunger 14 is disposed, and an adapter 21 is disposed at the exterior circumference of the injector bracket 20 and the plunger 14. At this time, a fuel injection guide pipe 24 is interposed between an exterior circumference of the plunger 14 and the interior circumference of the adapter 14.

In an upper part of the plunger 14, and the lower part of the injector bracket 20, a spring receiving groove is formed, and a spring is disposed in the spring receiving groove. In addition, the plunger defines an inner passageway through which fuel injected by the injector passes.

Figure 6:
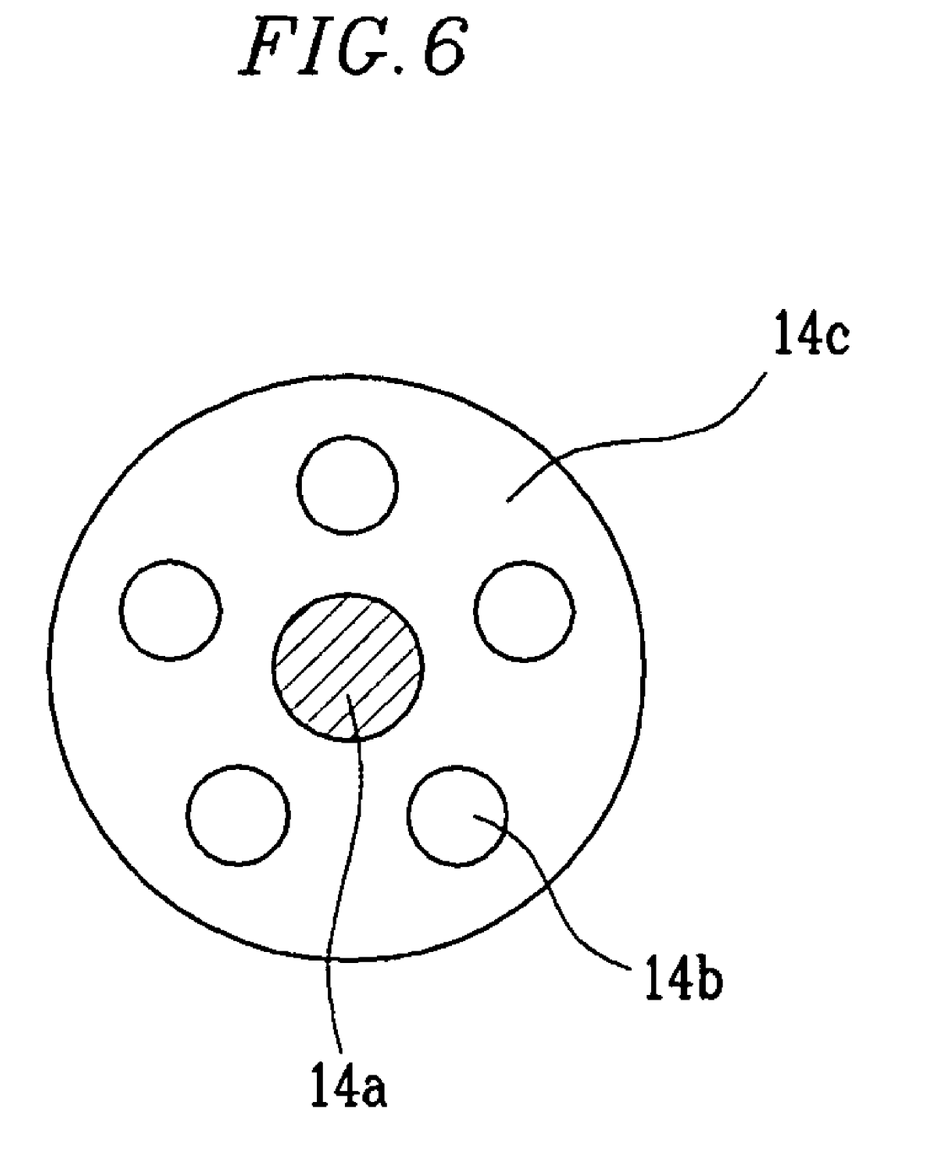
FIG. 6 is a cross-sectional view along a line VI-VI of FIG. 5 according to an exemplary embodiment of the present invention.

An end plate 14c is provided at a lower end of the plunger. On a lower surface of the end plate 14c a closing projection 14a is projected downward. As shown in FIG. 6, a plurality of penetration holes are formed around the closing projection 14a.

The fuel injection guide pipe 24 and the adapter 21 are combined with the screw thread 24a formed on the fuel injection guide pipe 24 and the screw thread 21a formed on the interior surface of the adapter 21.

Inside of the fuel injection guide pipe 24, an injection pipe 22 communicating with an injection hole 24b, valve seat 23, and a valve seat supporting pipe 25 is disposed.

The injection pipe 22 and the valve seat 23 are disposed inside of the fuel injection guide pipe 24, and are fixed with the valve seat supporting pipe 25. Inside of the valve seat supporting pipe 25, the fuel supplying pipe 6 and the plunger 14, operated with the electric power engaged in the core 10, are disposed.

According to this structure, the fuel injected from the outlet of the injector 2 passes through the fuel passage formed in the hollow plunger 14, the penetration hole 14b formed at an end of the plunger 14, and the injection hole 24b formed in the fuel injection guide pipe 24. The fuel passage is formed along the injecting direction of the injector 2, as a straight line. Therefore, fuel passing through the fuel passage doesn't collide with components disposed in the fuel injection system, and pressure loss may be reduced.

In addition, if an upper surface of the valve seat 23 facing a lower surface of the plunger 14 is formed to have a tapered shape that becomes narrow toward a lower end thereof, the fuel can flow smoothly.

In addition, since fuel doesn't collide with inner components of the fuel injection system in the process of injecting, and smoothly moves in the fuel injection system, pressure loss of the injection may be reduced. Especially, in the LPG engine, LPG may not be vaporized in the fuel injection system before being injected to the combustion chamber. Therefore, fuel can be injected efficiently without pressure loss, and incomplete combustion may not occur. So, noxious exhaust gas may be reduced.

Hereinafter, an operation of the fuel injection system will be described with reference to FIG. 5.

Firstly, when the ignition key is turned on and an engine is operated, the fuel injected from the injector 2 moves to an end of the fuel supplying pipe 6. At this time, electrical power is supplied to the solenoid valve 16 and a magnetic force is generated at the core 10. The magnetic force pulls the plunger 14 and compress the spring 15. Therefore, the fuel passage of the valve seat 23 is opened, and the fuel supplied to the fuel injection pipe 6 is injected through the penetration hole 14b formed in the plunger and the injection pipe 22 provided at an end of the plunger 14.

When the ignition key is turned off, the plunger 16 moves downward due to the elastic force of the spring 15 disposed in the spring receiving groove formed at a rear portion of the plunger 14. The projection 14a formed downward at the lower exterior surface of the plunger 14 also moves downward, and shuts off the fuel passage of the valve seat 23. Therefore, fuel leakage through the fuel supplying pipe 6 and the valve seat 23 can be prevented.

In addition, since fuel leakage to the combustion chamber is prevented, the engine can be easily started. In addition, an amount of noxious exhaust gas, created during an early stage of engine starting can be reduced.

As described above, according to exemplary embodiments of the present invention, a solenoid valve is provided in the fuel passage between the injector and the combustion chamber. Therefore, when the ignition key is turned off, fuel leaked at the injector is shut off by the solenoid valve, and fuel leakage to the combustion chamber may be prevented. Therefore, the problems of bad startability, creation of noxious exhaust gas, and damage of the ignition plug can be improved.

The above-mentioned advantageous effects can be achieved in various kinds of engine, for example, LPG engine, gasoline engine, etc.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel injection system, comprising:
an injector for injecting fuel by controlling amount of the fuel;
a case removably receiving the injector and defining a fuel passage between the injector and a nozzle pipe; and
a solenoid shut-off valve provided in the fuel passage between the injector and the nozzle pipe so as to selectively shut off the fuel passage;
wherein an injector bracket is provided in a lower part of the case; and
the solenoid valve is provided with a fuel injection guide pipe and coupled to the injector bracket such that the fuel injection guide pipe is disposed in the same direction as a fuel injection direction of the injector; and
wherein a plunger defines an inner passageway through which fuel injection by the injector passes; and
an end plate is provided at a lower end of the plunger, a closing projection being formed on the end plate and a plurality of penetration holes being formed on the periphery of the closing projection.

2. The A fuel injection system, comprising:
an injector for injecting fuel by controlling amount of the fuel;
a case removably receiving the injector and defining a fuel passage between the injector and a nozzle pipe; and
a solenoid shut-off valve provided in the fuel passage between the injector and the nozzle pipe so as to selectively shut off the fuel passage;
wherein an injector bracket is provided in a lower part of the case; and
the solenoid valve is provided with a fuel injection guide pipe and coupled to the injector bracket such that the fuel injection guide pipe is disposed in the same direction as a fuel injection direction of the injector; and
wherein a screw thread for coupling with the case is formed in an upper part of the injector bracket, and a core coupling part for coupling with a core of the solenoid valve is formed on a lower exterior surface of the injector bracket.

3. A fuel injection system, comprising
a case having an injector receiving part formed therein,
an injector being removably received in the injector receiving part, and
a solenoid shut-off valve disposed at an outlet of the injector receiving part, wherein the solenoid valve comprises:
a coil;
a hollow plunger having a fuel passage formed therein and communicating with the solenoid valve receiving part, a closing projection formed downward in a lower surface of the plunger, and a through hole formed in the periphery of the closing projection;
a fuel injection guide pipe disposed outside the plunger and having an injection hole formed on the position corresponding to the closing projection, and wherein the injection hole of the fuel injection guide pipe is selectively opened and closed by the plunger.

4. The injection system of claim 3, wherein:
a valve seat is disposed between the lower surface of the plunger and the fuel injection guide pipe;
the injection pipe communicating with the injection hole is combined to the valve seat; and
the closing projection opens and closes the inlet of the injection pipe.

5. The injection system of claim 4, wherein an upper surface of the valve seat facing a lower surface of the plunger is formed in a tapered shape as a diameter of the upper surface of the valve seat becomes narrow toward a lower end thereof.

* * * * *